P. & F. HINKEL.
Liquid Cooler.

No. 48,941. Patented July 25, 1865.

WITNESSES:
Fr. Buschhaupt
L. Stark.

INVENTOR.
Peter Hinkel
Frederick Hinkel

United States Patent Office.

PETER HINKEL AND FREDERICK HINKEL, OF NEW YORK, N. Y.

IMPROVED APPARATUS FOR COOLING LIQUIDS.

Specification forming part of Letters Patent No. 48,941, dated July 25, 1865.

*To all whom it may concern:*

Be it known that we, PETER HINKEL and FREDERICK HINKEL, both of the city, county, and State of New York, have invented a new and useful mode of refrigerating beer and other beverages being on draft; and we do hereby declare that the following is a full and exact description thereof, reference being had to the accompanying drawings, and to the letters of reference marked thereon.

The nature of our invention consists in providing the vessel containing the beer or beverage with a pipe of suitable metal introduced through the bung-hole or any other suitable opening, serving at the same time as a bung, which pipe, being close on its one end, is to be connected on its other or top end with a waste-pipe for leading of water, and with a vessel (surrounded with a bad conductor of heat, as charcoal, &c.) containing small pieces of ice, and so constructed as to allow a regular sinking of the ice into the mentioned pipe, whereby the cooling of the respective beverage must go on in the shortest time and in a most rational manner.

To enable others skilled in the art to make and use our invention, we will proceed to describe its construction and operation.

Figure 1:
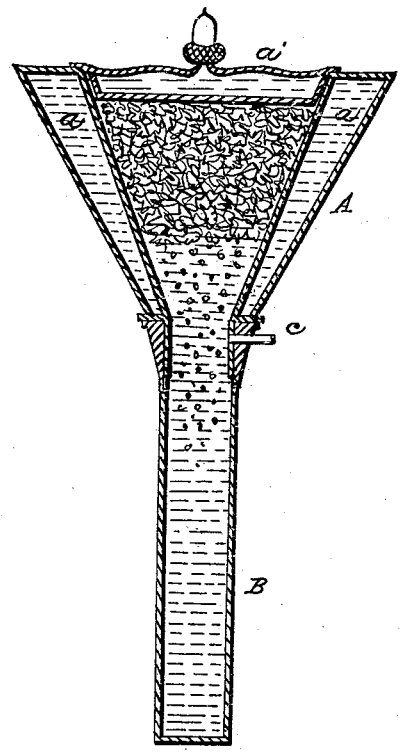
Figure 2:
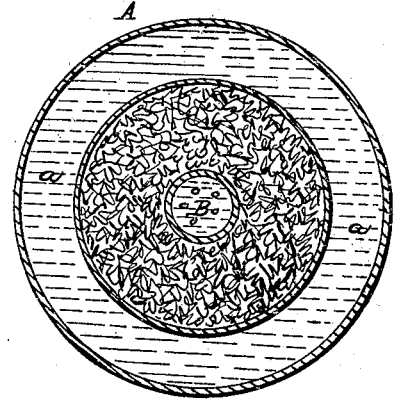
Figure 3:
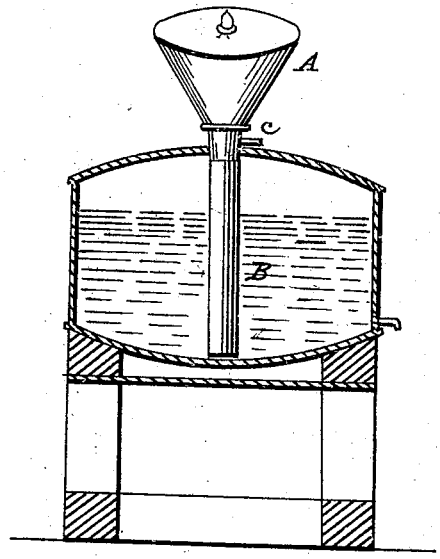

We construct our vessels serving for beer or other beverages on draft in any of the known forms and apply thereto all the appendages of such vessels; but in order to obviate an increase of temperature of the beverage, caused by the higher temperature of the outer atmospheric air, which may injure the beverage or make it less agreeable to drink, we close the bung-hole, instead of a wooden bung, with a pipe of tinned sheet-iron or any other suitable metal, closed on its one end, and in and out side well japanned or lacquered. We supply this pipe on its top end with a smaller pipe, $c$, as may be fully seen in the accompanying drawing, Figure 1, being intended to serve for discharge of the water resulting from the melting of the ice of the main pipe B. Lastly, we connect this pipe B, on its top end, with a vessel, A, surrounded with a chamber containing charcoal or any other bad conductor of heat, &c., and secure it on its place, as may be seen in the drawing, Fig. 1. We give this vessel A, in general, such construction that the small pieces of ice with which the inner chamber of the same must be filled can freely and regularly sink down into the pipe B.

As in this described mode of refrigerating beverages the beverage is only separated from the ice by a thin wall of metal, which is a good conductor of heat, it follows that the cooling of the beverage must take place in a short time and in a most rational manner.

We are well aware that other modes of refrigerating beer, &c., are in use; but we know just as well that in all cases the ice as cooling substance is placed outside the vessel, so that the wooden walls of the vessels have to serve as conductor; but wood, it is known, is a very bad conductor of heat. It follows, therefore, that in all such cases a much greater quantity of ice must be used so as to produce the same effect as in our described mode. Lastly, we will remark here that this described mode can inversely, with profit, be used to warm instead of cooling beverages, which may sometimes and in some cases be required. In such cases it is only necessary to fill the mentioned vessel A with warm or hot water, &c.

Having now fully described our invention, we wish it distinctly understood that we do not claim the mode of refrigerating beer or other beverages wherein the ice as cooling substance is placed outside the vessel containing the respective beverage; but

What we claim for us as new, and desire to secure by Letters Patent, is—

The mode of refrigerating beer and other beverages herein fully described, and for the purpose set forth.

PETER HINKEL.
    FREDERICK HINKEL.

Witnesses:
  FR. RUSCHHAUPT,
  L. STARK.